United States Patent [19]

Garrett

[11] 4,129,440

[45] Dec. 12, 1978

[54] PROCESS FOR DISPOSAL OF SOLID WASTES

[75] Inventor: Donald E. Garrett, Claremont, Calif.

[73] Assignee: Occidental Petroleum Corporation, Los Angeles, Calif.

[21] Appl. No.: 759,749

[22] Filed: Jan. 17, 1977

Related U.S. Application Data

[63] Continuation of Ser. No. 551,452, Feb. 19, 1975, abandoned, which is a continuation of Ser. No. 371,042, Jun. 22, 1973, abandoned, which is a continuation of Ser. No. 113,115, Jul. 8, 1970, abandoned.

[51] Int. Cl.² .......................... C22B 7/00; C10B 53/08
[52] U.S. Cl. ............................................ 75/63; 201/8; 241/21; 241/28

[58] Field of Search ................. 75/1, 24, 63, 101, 109; 201/8; 241/21, 28

[56] References Cited

U.S. PATENT DOCUMENTS

| 2,943,930 | 7/1960 | Proler | 75/445 |
| 3,444,046 | 5/1969 | Harlow | 201/8 |
| 3,448,509 | 6/1969 | O'Reilly | 75/65 |
| 3,549,092 | 12/1970 | Baxter | 241/21 |

Primary Examiner—P. D. Rosenberg
Attorney, Agent, or Firm—Christie, Parker & Hale

[57] ABSTRACT

Solid trash is comminuted and classified into an organic fraction and a metals-inorganic fraction. The organic fraction is processed for recovery of paper pulp and the residue pyrolysed. The metals-inorganic fraction is processed for recovery of each major metal and inorganic constituent.

32 Claims, 4 Drawing Figures

PROCESS FOR DISPOSAL OF SOLID WASTES

CROSS REFERENCE TO RELATED APPLICATIONS

This is a continuation of application Ser. No. 551,452, filed Feb. 19, 1975) now abandoned which is a continuation of Application Ser. No. 371,042, filed June 22, 1973, now abandoned which was a continuation of Application Ser. No. 113,115, filed July 8, 1970, now abandoned.

BACKGROUND OF THE INVENTION

Immense and ever-increasing quantities of solid trash are generated each day which present major collection, disposal and nuisance problems. Costs of disposal ranks third behind public schooling, highways and general municipal expenses. Quantities of trash that daily accumulate in large cities is truly staggering to the imagination. It is estimated that each individual in the country generates between 4–6 lbs. of trash per day. The trash from industrial sources is equivalent to an additional 5–10 lbs. per person per day. The average cost of disposal is approximately $5 to $10 per ton of trash.

Conventional methods of disposal such as landfill or more incineration are becoming prohibitively expensive or creating serious pollution problems. Landfill areas are, for instance, becoming decreasingly fewer in number and further from the municipalities where the trash is being generated.

Incineration, where not already prohibited because of pollution problems, is being looked at with ever-increasing skepticism. In addition, incineration still produces solid residue which must, in some way, be disposed of.

A second aspect of waste disposal is that conventional disposal methods constitute a permanent loss of natural resources. Every nation is consuming its natural resources at an everincreasing rate. Many of the essential minerals and metal reserves have a fairly limited life. Even such seemingly inexhaustible commodities such as paper, can be projected in coming years to be insufficient to meet the demand. Still, through trash disposal, natural resources are continuously and permanently being depleted.

SUMMARY OF THE INVENTION

According to the present invention, solid waste is treated in a manner to economically recover the values therein and convert the organic residue to useful chemical and fuel by-products.

This may be accomplished by a process which comprises comminuting the solid wastes to a more handleable mass; classifying the comminuted mass into an organic fraction and a metals-inorganic fraction by air and/or water elutriation, processing the organics fraction for recovery of paper pulp and pyrolysis of the organic residue to form a gaseous stream containing chemical values and a solid fuel char.

Magnetic ferrous materials are separated magnetically from either the unclassified comminuted trash or the metals-inorganic fraction following classification. The metals-inorganic fraction once free of ferrous materials is then separated by controlled heavy media separation into fractions of common density, which are further separated into their valuable components by heavy media, flotation and particle size separations, as well as other mineral dressing techniques.

By this method, most of the contents of the trash are segregated into resalable and reusable scrap groupings of metals, glass, and paper pulp, or converted into useful chemicals and fuel. Their resale will offset, to a major degree, the cost of the processing operation or yeild a profit and, more importantly, permits reclamation of our natural resources.

DESCRIPTION

According to the present invention there is provided a process for disposal of solid waste. The basic steps carried out in accordance with the process of this invention comprise comminuting the solid waste to a size suitable for further processing; classifying the solids into an organic fraction and a metals-inorganic fraction by air and/or water elutriation; processing the organic fraction for recovery of paper pulp and pyrolyzing the organic residue to form a gaseous stream containing recoverable chemicals and a solid char having value as a source of fuel or carbon. The metals-inorganic fraction is then processed for separation and recovery of various metals and glass found therein.

With this basic scheme, the precise nature of the passage of solid waste recovery operation may be varied widely, depending on equipment employed and the nature of solid waste being processed.

As used herein, and in conjunction with the several processing operations described the term "comminution" refers to any physical act of size reduction including but not limited to chopping, crushing, tearing, shredding and grinding by suitable machinery.

Figure 1:
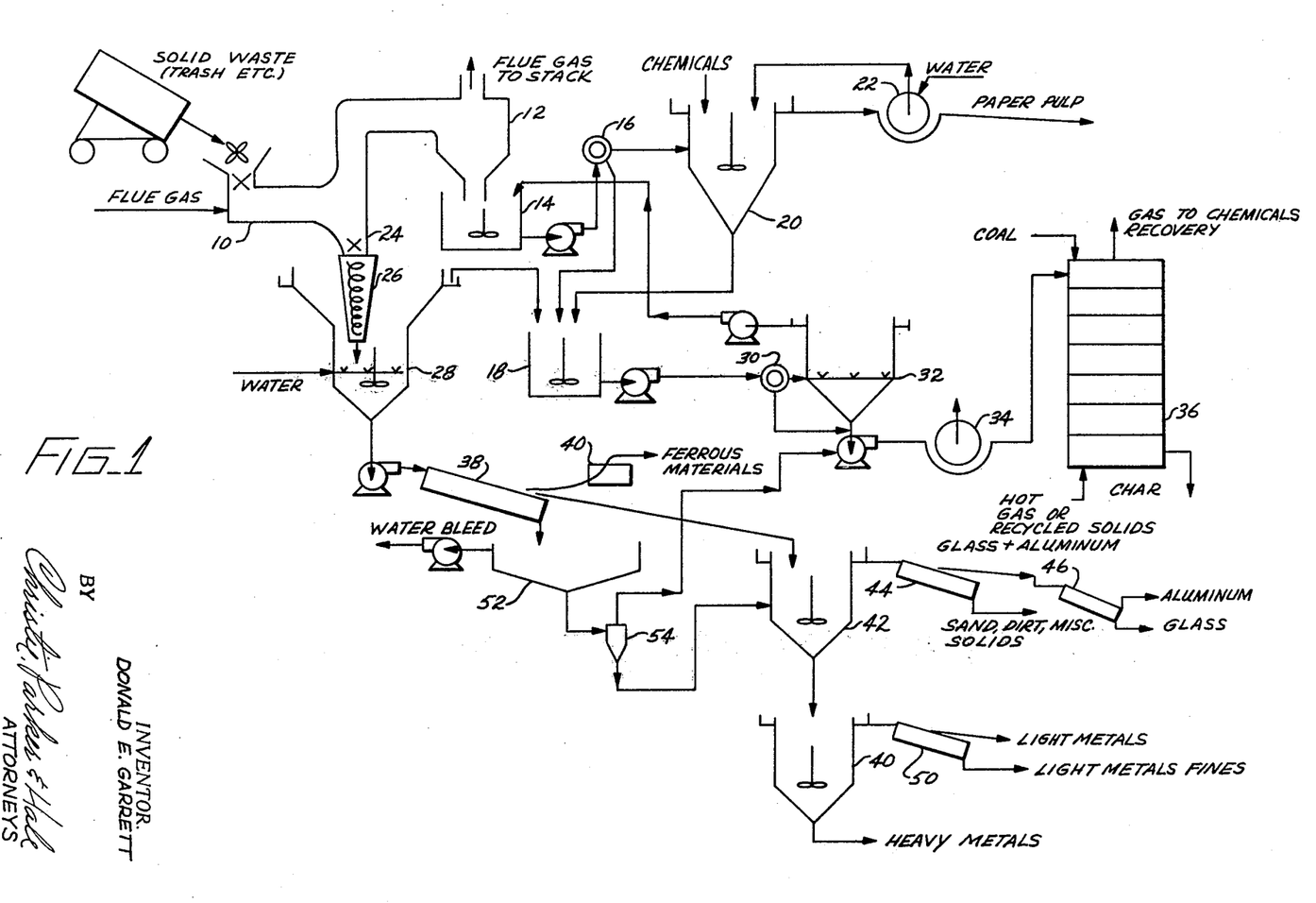
FIG. 1 is an illustration of one scheme processing solid wastes.

One convenient scheme is shown in FIG. 1. With reference thereto, the solid waste is fed to a first comminuter 10, illustrated as a chopping mill, which provides an initial trash expansion, fluffing, or mild size reduction. The effluent from comminuter 10 is then brought into contact with a gas stream, preferably a hot flue gas supplied from another part of the process, which dries the comminuted waste and allows a majority of the paper stock present to pass by gas elutriation to collection chamber 12. When this procedure is followed, the degree of comminution carried out in chopping mill 10 is generally kept to a minimum in order that fairly large paper stock will be collected in chamber 12. The paper collected in this manner will generally be comparatively free of contaminants and may readily be disintegrated in pulping tank 14. The material which is not disintegrated to fiber size in the pulping tank 14 is cylconed, screened or otherwise removed from the pulp in 16 and passed to a second pulping tank 18 or sent to other recovery equipment such as a system for removing plastics by density differential. The disintegrated pulp is then passed to a second classifier or purification stage 20 where it is further washed and purified and passed to dewatering equipment 22 where it leaves as paper pulp for sale or for deinking and bleaching treatments in a manner conventional to waste paper operations. Impurities from the purifier 20 are then passed to the second pulping tank 18.

The solids which are not carried by the hot gas stream to paper collection chamber 12 are passed to a second comminuter 26, again shown as a chopping mill, for a further size reduction and passed to gravity separator 26 where segregation occurs by density differentials.

From there, particles then pass to elutriator-classifier 28 or a similar separatory vessel where there is separated the organic fraction of materials having an effective density less than or equal to that of the upflowing water or which is light enough to be carried upwards by current flow. The organic fraction containing the balance of the pulp and pulp-like materials is passed to pulping tank 18 for disintegration with the impure-pulp fractions from strainer 16 and purifier 20. After pulping the mass is cycloned and passed to strainer 30 for separation of coarse matter, and a secondary pulp purifier 32 where the pulp is sent to sale or further processing, or returned to pulping tank 14 for reseparation and processing with the dry-separated paper pulp.

The organic residue which remains, including any unwanted pulp, is dewatered in unit 34 and passed to a pyrolysis furnace 36, either after or without drying. A multi-stage pyrolysis furnace is shown for conversion to a gas stream containing recoverable chemicals and solid char, as hereinafter explained. A flash pyrolysis unit may also, and preferably be used, as well as a rotary kiln or other carbonizing equipment. In the alternative, and where hot gas elutriation removes most of the paper pulp values from the trash, the organic fraction may be passed from classifier 28 to filter or screen 34 and then to pyrolysis furnace 36, or the dry solid waste may be sent directly to the pyrolysis unit.

The underflow from classifier 28 is first passed over screen 38 to permit the fine and silt-like materials in the waste to separate from the metals-inorganic fraction. The resultant fraction is then passed through magnetic separator 40 where the magnetic ferrous materials are separated from the metals-inorganic fraction for processing as iron scrap.

The residual metals and inorganics are then passed through to heavy media separator 42 where the inorganics and metals of common density or a metal having density lower than the inorganics such as magnesium, are collected at the top and the heavier metals settle to the bottom as underflow. In heavy media separation, effective media specific gravity may be precisely adjusted by the addition of iron oxide and the like to water to form a slurry. At a selected effective specific gravity, substances having a lower specific gravity will float whereas substances having a higher specific gravity will sink.

The grouping which collects at the top of heavy media separator 42 may then be passed through screen separator 44 where crushed glass and aluminum are separated from sand, dirt, etc., by particle size differential.

The glass may then be separated from the aluminum by particle size differential in a separate crushing and screening operation in 46. If the particles are close in size, the particle size differential required for screening can be established by passing the group to a ball mill or the like where aluminum and magnesium, if present, are flattened and the glass further crushed. The recovered glass may then be sold for reformation into bottles and the like.

If magnesium is present it may in the alternative be separated from the inorganics and/or aluminum be heavy media separation.

The heavy metals fraction which is the underflow from heavy media separator 42 may then be segregated in one or more heavy media separators 48 where by sink-float separation, the heavier metals are separated from the lighter metals. For the separation illustrated, the lighter metals after separation from the heavier metals are screened in screen separator 50 to remove light metals fines.

Alternatively, steps of melting, leaching and flotation can be used to fine separate the several metals in the heavy metals group into groupings of relatively pure metals for further processing and purification.

The slimes contained in the various streams are then sent to thickener 42 where process water is recovered and where the separated solids are sent to cyclone 54 to separate inorganic materials for return to the heavy media separation system.

As the process water will, over time, show an attendant buildup of soluble impurities it would have to be discarded or processed by evaporation for reclamation.

Figure 2:
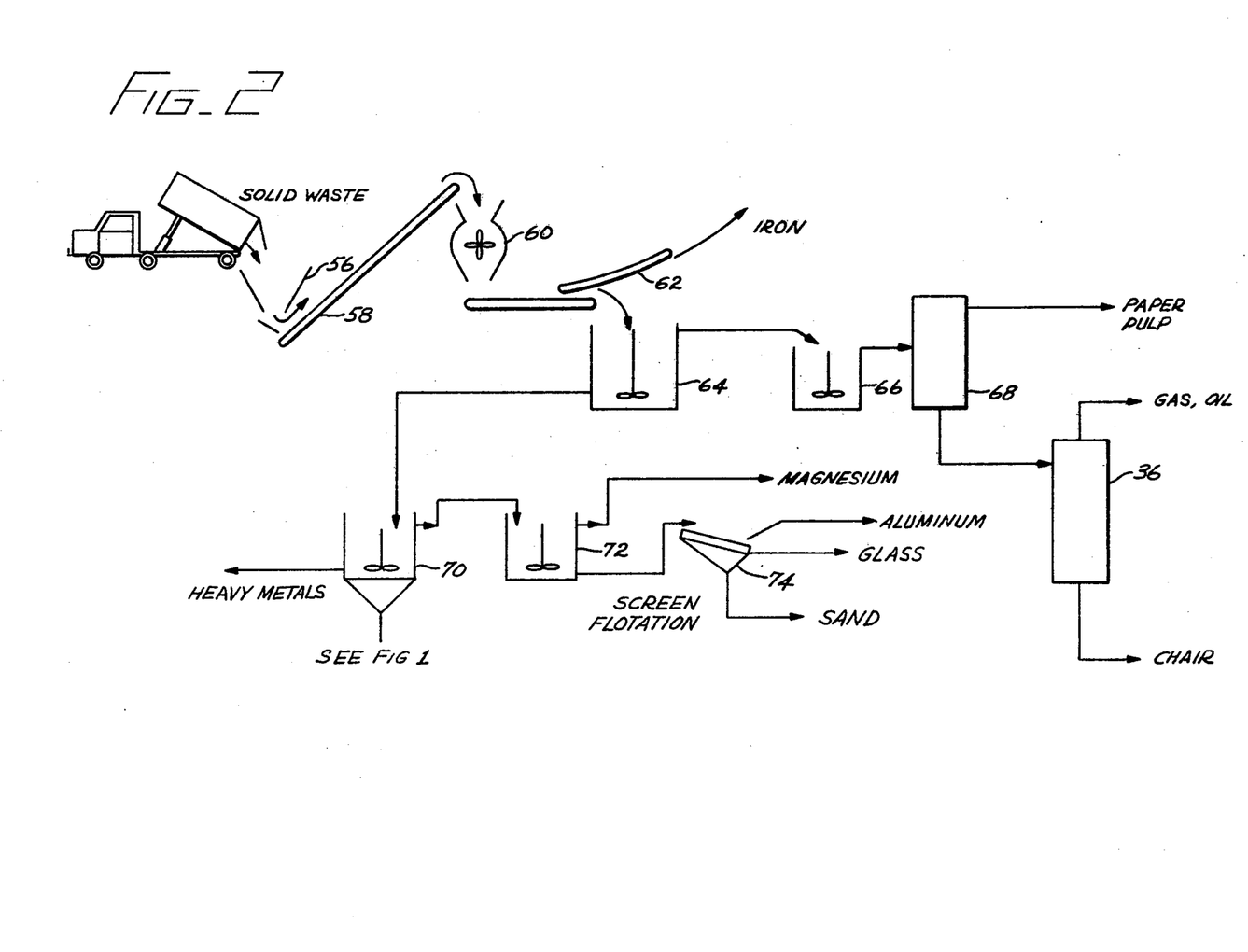
FIG. 2 is an illustration of another scheme for processing solid wastes.

An alternative processing scheme which has certain regional advantages is illustrated in FIG. 2. In certain regions of the United States there is a good market for tin cans, and it is important to recover them fairly intact so that any organic residues can be effectively removed and the cans detinned and shredded for use in the copper industry. In addition, early removal of ferrous materials separates from the solid waste large masses of materials which would otherwise add crushing and grinding loads and costs.

For such waste systems, the solid wastes, after being dumped into hopper 56, are conveyed by conveyor 58 to an expander, fluffer, or mild comminuter 60, which in the present instance is shown as the hammer mill, and where initial expansion occurs. The effluent is passed to a magnetic separator 62, such as a magnetic belt, which separates tin cans, iron and the like from non-magnetic materials which pass to a dry or wet classifier 64, with perhaps some additional comminutions. The separated tin cans and iron are then passed to a processing system fairly intact where organic matter is efficiently removed and detinned and shredded for use in the copper industry. In classifier 64, the inorganics and non-ferrous metals settle to the bottom as an underflow while the organics are taken off the top for passage to shredder 66.

Since only partial comminution has occurred in hammer mill 60 additional comminution is required to shred waste paper and the like to allow good fiber separation and paper pulp recovery from the solid organic in fiber separator 68. After separating the paper pulp, the residual organic materials including coarse fibers are passed from fiber separator 68 to pyrolysis furnace 36.

The inorganic non-ferrous metals fraction is then passed to heavy media separator 70 where there is performed a separation between the inorganics and light metals such as magnesium and aluminum from the heavier metals such as copper or stainless steel. The inorganics and lighter metals are then passed to heavy media separator 72 where there is achieved a cut between an aluminum-inorganics fraction and magnesium which is taken off at the top. This is followed by separation of aluminum from inorganics by flotation or screening operation such as in screen separator 74 where particle size differentials are used to achieve a segregation of these materials.

Figure 3:
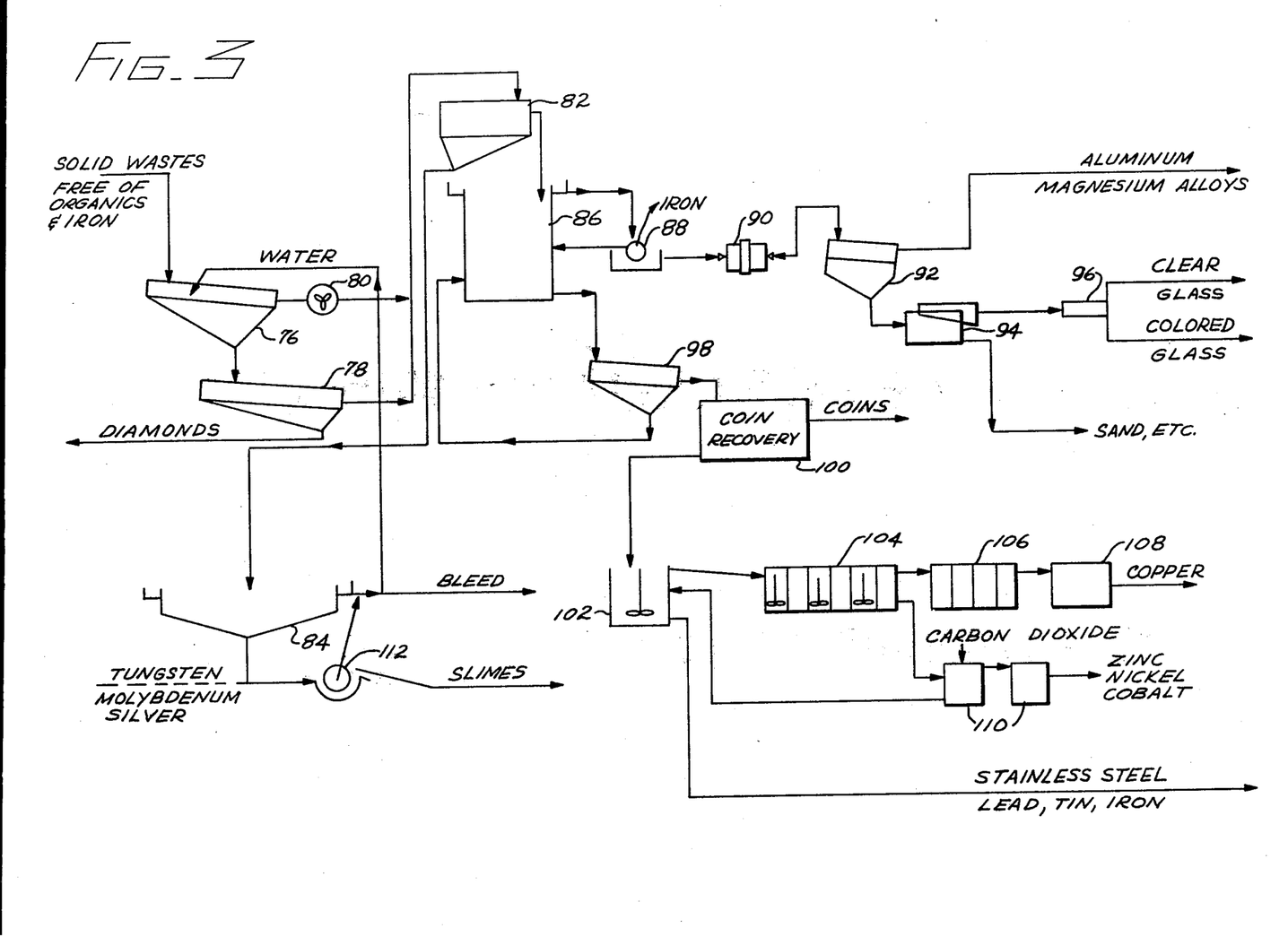
FIG. 3 is a detail scheme for processing the metals-inorganic fraction of solid waste.

A system particularly useful in separating the iron-free metals-inorganic fraction is more particularly described in FIG. 3. The heavy wastes fraction separated from iron by magnetic separation and organics by classification, is fed to large screen separator 76. As only a minor amount of comminution may have been previously accomplished such as in hammer mill 60 of FIG. 2, the aggregate of metals and inorganics is still fairly large and this permits an initial segregation by size. Screen separator 76, which is of a fairly large screen size, say about one inch, may be used to permit normally smaller articles such as jewelry, diamonds and the like to pass through. These are passed through to grease table 78 which attracts any diamonds present and attendant gold fittings for hand separation. The materials which do not pass through the screen of screen separator 76 are shredded in shredder 80 and combined with materials rejected from grease table 78 and passed to a finer screen 82 of less than 1 in. size. The fines are then passed to classifier 84. The more coarse materials are passed to heavy media separator 86 where there is conducted a heavy separation between the heavy metals which separate as an underflow from the inorganics and lighter metals.

Any residual ferrous materials in the light group may be separated from the lighter group in magnetic separator 88. The residue is passed to ball mill 90. There, a size differential is created between the inorganics and aluminum and magnesium alloys present as the ball mill will tend to flatten the softer aluminum and magnesium metals to increase their effective size, while crushing glass and the like to a finer state.

The flattened metals and crushed inorganics are then passed to screen separator 92, the aluminum and magnesium metals remaining on the screen while the inorganics pass through to flotation cell 94 or a similar device where the glass and sand for use in glass fabrication are floated from brick, ceramic and concrete residues, the latter being discarded. The glass and sand are then passed through a high intensity magnetic separator 96 where iron content of colored glass is relied upon to separate colored from clear glass.

The heavy metals which settle to the bottom of heavy media separator 86 are passed to fine screen separator 98 having a mesh size of about 65 mesh which permits a separation of the metals from the separating media which is recycled back to heavy media separator 86. The metals separated in screen separator 98 are passed to coin recovery system 100 where a coin isolation is accomplished by jigging and similar means followed by hand sorting of the coins from metal objects of a similar size.

The heavy metals are then passed to a suitable processing system. They may, for instance, be first passed to ammonia leach tank 102 which separates metals such as copper, nickel, cobalt and zinc from stainless steel and any residual iron which are combined with the iron removed earlier in the process. The leached metals are then passed to solvent extractor 104 where a primary and/or secondary amines are used to separate copper from the balance of the leached metals. Copper is then recovered by passage through stripper 106 and electrolysis unit 108. The zinc, nickel and cobalt which are separated from the copper are then passed to precipitation separators 110 where they are converted to carbonate salts by carbon dioxide addition. The resultant liquor is returned back to ammonia leach separator 102.

The liquor from screen separator 98 with attendant heavy fluid particles is passed to heavy fluid separator 84 where it is further used. The contaminated bleed water is passed to an evaporator (not shown) for water recovery and solids disposal from settler 84.

The mass of compacted particles from clarifier 84 may contain various materials such as molybdenum, tungsten, silver and the like and may, where desired, be filtered out in filter 112 and the residual slimes passed to either the pyrolysis furnace or to waste.

Figure 4:
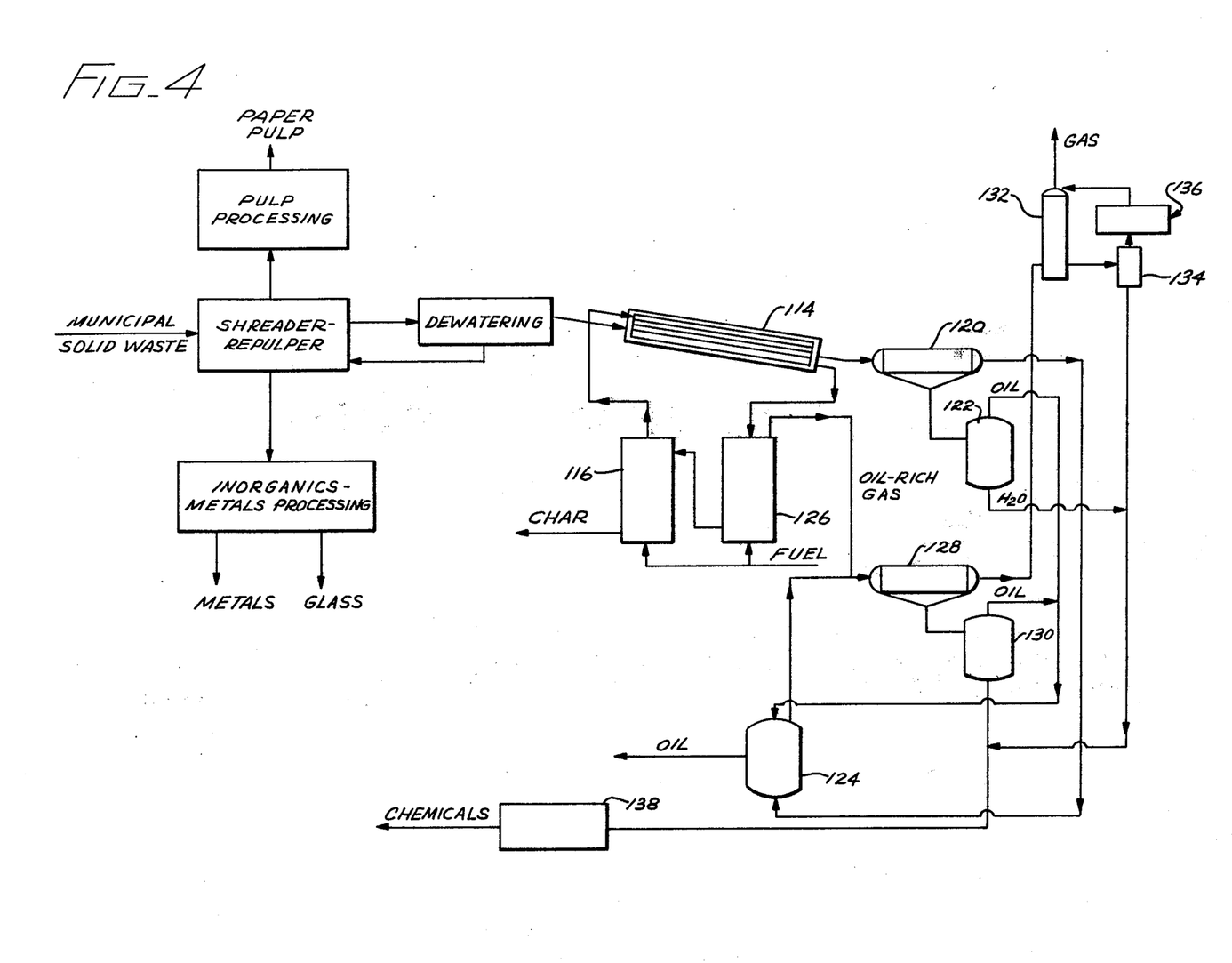
FIG. 4 is a detail schematic for the processing measures used in the pyrolysis of organics found in the waste.

FIG. 4 shows, in detail, a pyrolysis system for converting the organic fraction or residue to chemical values and char having a value as fuel. As a predicate to pyrolysis, there is performed, as indicated, the comminution, classification, pulping and preliminary dewatering operations to yield an organic residue suitable for feed to a pyrolysis system. While the organic residue may be fed directly with or without additional fuel, such as coal, to a pyrolysis furnace, they are preferably passed to dryer 114 where the residue is brought in concurrent or countercurrent contact with the hot gaseous effluent from a pyrolysis furnace 116.

The water and organics volatilized during drying are condensed in condenser 120 and passed to phase separator 122 where there is separated oil and other low density organic constituents from condensed water. The non-condensed organics and any hydrogen evolved are passed to hydro-treater 124 for ultimate conversion to high grade oil by hydrogenation. Alternately, flue gas may be used for direct or indirect contact drying. Also, with dry pulp, or with small systems no drying is required.

The dried organics from dryer 114 are passed to a first high velocity, low particle density pyrolysis furnace 126 where it is admixed with a carbonaceous fuel source, such as particulate coal, or with hot recycle char and decomposed under non oxidizing conditions at temperatures of from 700° to 1300° F. to form an oil-rich gas and char. The gaseous effluent from pyrolysis furnace 126 is generally an oil-rich gas which is passed to condenser 128 with the water formed during the pyrolysis, and oils are condensed. The condensate is passed to phase separator 130 where oil is separated from water, the oil being passed to hydro-treater 124 where it is hydrogenated along with the other crude oil organics obtained in phase separator 122 to high grade synthetic crude oil. The oil formed is of a relatively low molecular weight and high aromatic content.

The char from pyrolysis furnace 126 is then passed to pyrolysis furnace 116 where it is devolatilized at temperatures of from about 1200° to 2400° F. in one or two stages to form the hydrogen-rich gas stream and a char of high BTU, low sulfur content for power plant fuel. After passing through the condensers 120 and 128, the gas is fed to purifier 132 where the condensable chemicals are condensed and the residual gases, which are of high methane content, pass to purification operations (not shown) for recovery of HCl, HF, $H_2S$ (which is ultimately converted to sulfur). The hydrogen containing gases, as previously noted, are consumed or used in hydro-treating operation.

The condensed chemicals and water from gas purifier 132 are passed to phase separator 134 where oxygenated and aromatic chemicals are obtained as the liquid fraction. The balance of the condensed organics are sent to hydro-treater 124 for conversion to oil. Any residual gases after being stripped in stripper 136 are combined with the gas stream coming from gas purifier 132.

Water from the phase separators 122, 130 and 134 are combined and passed to a water treater 138 to recover any of the water soluble chemicals.

The char resulting from pyrolysis and devolatization may contain valuable minerals such as gold, silver, phosphates, aluminums and the like. In such instances, the char is leached with cyanide for gold and silver recovery and acid leached for phosphates, soluble salts, aluminum and other metals or by caustic and similar leaching operations.

While the fuel used to enrich organic residue fed to the pyrolysis furnaces may be varied widely, a convenient fuel is coal. This would allow the pyrolysis products of coal to be recovered along with the pyrolysis products of the organic residue to accomplish two pyrolysis recovery operations in one step. The presence of coal would also stabilize the pyrolysis, allow a more uniform and steady operation, and ensure a comparatively high BTU content of residual char. As indicated, coal also provides a larger production base to improve recovery economics and allow a power plant to be located adjacent to the solid waste recovery facility to consume the char products.

The coal supplied may be fed directly to the furnace or used in some initial stage of the processing operation. Coal may be initially used, for instance, as a filter bed for the sewage or on a filter acid precoat. Once the coal is spent, it may be passed to the pyrolysis furnace for treatment with the organic residues. It will be realized, however, that for many operations coal or other carbonaceous materials may not be required.

The process of this invention is useful for the processing of a wide variety of solid wastes. There may be processed, for instance, domestic wastes, industrial wastes, animal wastes, food processing wastes, tires and hospital wastes. Where solid trash contains a high quantity of plastics, they may be recovered from the organic fraction by flotation, electrostatic, particle size and like separation means. Alternatively, the plastics may be suitably comminuted and passed to the pyrolysis zone for conversion to char and chemical by-products.

What is claimed is:

1. A process for recovery of values from solid wastes which contain paper stock which comprises in combination:
   (a) initially expanding the solid waste to permit elutriation;
   (b) classifying by elutriation the initially expanded solid waste into a first organic fraction containing the paper stock and a predominately inorganic-metals fraction containing residual organic waste, elutriation of the paper stock from the inorganic-metals fraction containing residual organic waste occurring by an upward flow of a gas stream through the initially expanded solid waste;
   (c) collecting the first organic fraction;
   (d) pulping the first organic fraction, and separating paper pulp to leave a first organic residue;
   (e) further comminuting the predominately inorganic-metals fraction containing the residual organic waste and separating the residual organic waste therefrom by elutriation by an upward flow of water through the further comminuted inorganic-metals fraction to form a second organic residue;
   (f) pyrolyzing the first and at least a portion of the second organic residues under nonoxidizing conditions to form char and a gaseous stream containing condensible hydrocarbons and gases; and
   (g) processing the inorganic-metals fraction to recover values contained therein.

2. A process as claimed in claim 1 in which the solid waste contains magnetic ferrous materials and the magnetic ferrous materials are magnetically separated from the comminuted solid waste prior to classifying the solid waste into the first organic fraction and the inorganic-metals fraction.

3. A process as claimed in claim 1 in which the solid waste contains magnetic ferrous materials and the magnetic ferrous materials are magnetically separated from the inorganic-metals fraction following classification of the solid waste into the first organic fraction and the inorganic-metals fraction.

4. A process as claimed in claim 2 in which tinned ferrous metals in the magnetic ferrous materials are stripped of organic-residues, de-tinned and further comminuted.

5. A process as claimed in claim 1 in which the first and second organic residues is pyrolyzed in the presence of a carbonaceous material.

6. A process as claimed in claim 5 in which the carbonaceous material is coal.

7. A process as claimed in claim 1 in which pyrolysis is at a temperature of from 800° to 1800° F.

8. A process as claimed in claim 5 in which pyrolysis is at a temperature of from 800° to 1800° F.

9. A process as claimed in claim 7 in which the resultant char is devolatilized at a temperature of from 1200° to 2000° F. to form a hydrogen rich gas stream.

10. A process as claimed in claim 8 in which the resultant char is devolatilized at a temperature of from 1200° to 2000° F. to form a hydrogen rich gas stream.

11. A process as claimed in claim 1 in which the inorganics-metals fraction is separated into a fraction comprising inorganics and aluminum and a heavy metals fraction by heavy media separation.

12. A process as claimed in claim 11 in which the fraction comprising inorganics and aluminum is separated into an inorganics fraction and a fraction comprising aluminum by particle size differential.

13. A process as claimed in claim 11 in which:
   (a) copper and zinc are leached from the heavy metals fraction with ammonia;
   (b) stripping leached copper from the resultant solution; and
   (c) recovering copper by electrolysis.

14. A process as claimed in claim 13 in which the carbonate salts comprising zinc carbonate are precipitated from the solution following copper stripping by carbonate addition.

15. A process as claimed in claim 1 in which the inorganic-metals fraction contains diamonds, coins and precious metals and is:
   (a) passed through a grease table for diamond separation; and
   (b) jigged to separate coins and precious metals.

16. A process as claimed in claim 1 in which the solid waste contains plastics which are separated from the residual organic waste by means of density differential or flotation.

17. A process for recovery of values from solid wastes which contain paper stock which comprises in combination:
   (a) initially expanding the solid waste to permit gas elutriation;
   (b) simultaneously drying and classifying by elutriation the initially expanded solid waste into a first organic fraction containing at least the paper stock and a predominately inorganic-metals fraction containing residual organic waste, drying and elutriation of the organic fraction containing the paper stock from the inorganic-metals fraction containing residual organic waste occurring by an upward flow of a hot gas stream through the initially comminuted solid waste and yielding dried paper stock;

(c) collecting the dried first organic fraction;

(d) pulping the collected first organic fraction, and separating paper pulp to leave a first organic residue;

(e) further comminuting the predominately inorganic-metals fraction containing the residual organic waste and separating the residual organic waste therefrom by elutriation by an upward flow of water through the further comminuted inorganic-metals fraction to form a second organic residue;

(f) pyrolyzing the first and at least a portion of the second organic residues under nonoxidizing conditions to form char and a gaseous stream containing condensible hydrocarbons and gases; and (g) processing the inorganic-metals fraction to recover values contained therein.

18. A process as claimed in claim 17 in which the solid waste contains magnetic ferrous materials and the magnetic ferrous materials are magnetically separated from the comminuted solid waste prior to classifying the solid waste into the first organic fraction and the inorganic-metals fraction.

19. A process as claimed in claim 19 in which the solid waste contains magnetic ferrous materials and the magnetic ferrous materials are magnetically separated from the inorganic-metals fraction following classification of the solid waste into the first organic fraction and the inorganic-metals fraction.

20. A process as claimed in claim 17 in which pyrolysis is at a temperature of from 800° to 1800° F.

21. A process for recovery of values from solid wastes which contain paper stock which comprises in combination:

(a) initially expanding the solid waste to permit gas elutriation;

(b) classifying by elutriation the initially expanded solid waste into a first organic fraction containing at least the paper stock and a predominately inorganic-metals fraction containing residual organic waste, elutriation of the organic fraction containing the paper stock from the inorganic-metals fraction containing residual organic waste occurring by an upward flow of a gas stream through the initially comminuted solid waste;

(c) collecting the first organic fraction;

(d) pulping the collected first organic fraction, and separating paper pulp to leave a first organic residue;

(e) further comminuting the predominately inorganic-metals fraction containing the residual organic waste and separating the residual organic waste therefrom by elutriation by an upward flow of water through the further comminuted inorganic-metals fraction to form a second organic residue;

(f) pyrolyzing the first and at least a portion of the second organic residues under nonoxidizing conditions in a multi-stage pyrolysis zone to form char and a gaseous stream containing condensible hydrocarbons and gases; and (g) processing the inorganic-metals fraction to recover values contained therein.

22. A process as claimed in claim 21 in which the solid waste contains magnetic ferrous materials and the magnetic ferrous materials are magnetically separated from the comminuted solid waste prior to classifying the solid waste into the first organic fraction and the inorganic-metals fraction.

23. A process as claimed in claim 21 in which the solid waste contains magnetic ferrous materials and the magnetic ferrous materials are magnetically separated from the inorganic-metals fraction following classification of the solid waste into the first organic fraction and the inorganic-metals fraction.

24. A process as claimed in claim 21 in which pyrolysis is at a temperature of from 800° to 1800° F.

25. A process for recovery of values from solid wastes which contain paper stock which comprises in combination:

(a) initially expanding the solid waste to permit gas elutriation;

(b) simultaneously drying and classifying by elutriation the initially expanded solid waste into a first organic fraction containing at least the paper stock and a predominately inorganic-metals fraction containing residual organic waste by drying, elutriation of the organic fraction containing the paper stock from the inorganic-metals fraction containing residual organic waste occurring by an upward flow of a hot gas stream through the initially comminuted solid waste and yielding dried paper stock;

(c) collecting the dried first organic fraction;

(d) pulping the collected first organic fraction, and separating paper pulp to leave a first organic residue;

(e) further comminuting the predominately inorganic-metals fraction containing the residual organic waste and separating the residual organic waste therefrom by elutriation by an upward flow of water through the further comminuted inorganic-metals fraction to form a second organic residue;

(f) pyrolyzing the first and at least a portion of the second organic residues under nonoxidizing conditions in a multi-stage pyrolysis zone to form char and a gaseous stream containing condensible hydrocarbons and gases; and (g) processing the inorganic-metals fraction to recover values contained therein.

26. A process as claimed in claim 25 in which the solid waste contains magnetic ferrous materials and the magnetic ferrous materials are magnetically separated from the comminuted solid waste prior to classifying the solid waste into the first organic fraction and the inorganic-metals fraction.

27. A process as claimed in claim 25 in which the solid waste contains magnetic ferrous materials and the magnetic ferrous materials are magnetically separated from the inorganic-metals fraction following classification of the solid waste into the first organic fraction and the inorganic-metals fraction.

28. A process as claimed in claim 25 in which pyrolysis is at a temperature of from 800° to 1800° F.

29. A process for recovery of values from solid waste containing as part of an included ferrous magnetic fraction containing tinned ferrous materials and paper stock which comprises in combination:

(a) initially expanding the solid waste without substantial comminution of the tinned cans to permit classification;
(b) passing the expanded solid waste through a magnetic separation zone to separate the ferrous magnetic fraction from the expanded solid waste and leave a residue expanded solid wastes;
(c) detinning the tinned ferrous materials contained in the separated ferrous magnetic fraction;
(d) classifying the residue expanded solid waste into a first organic fraction containing the paper stock and a predominately inorganic-metals fraction containing residual organic waste;
(e) pulping the first organics fraction, and separating paper pulp to leave a first organic residue;
(f) separating the residual organic waste from the predominately inorganic-metals fraction containing the residual organic waste to form a second organic residue;
(g) pyrolyzing the first and at least a portion of the second organic residues under nonoxidizing conditions to form char and a gaseous stream containing condensible hydrocarbons and gases; and
(h) processing the inorganic-metals fraction to recover values contained therein.

30. A process as claimed in claim 29 in which pyrolysis is at a temperature of from 800° to 1800° F.

31. A process as claimed in claim 29 in which pyrolysis occurs in a multi-stage pyrolysis zone.

32. A process as claimed in claim 31 in which pyrolysis is at a temperature of from 800° to 1800° F.

* * * * *